No. 739,995. PATENTED SEPT. 29, 1903.
J. DEWRANCE.
GLAND PACKING.
APPLICATION FILED MAR. 6, 1903.
NO MODEL.

WITNESSES: INVENTOR:

No. 739,995. Patented September 29, 1903.

UNITED STATES PATENT OFFICE.

JOHN DEWRANCE, OF SOUTHWARK, ENGLAND.

GLAND-PACKING.

SPECIFICATION forming part of Letters Patent No. 739,995, dated September 29, 1903.

Application filed March 6, 1903. Serial No. 146,527. (No model.)

*To all whom it may concern:*

Be it known that I, JOHN DEWRANCE, a subject of the King of Great Britain and Ireland, residing at 165 Great Dover street, Southwark, in the county of Surrey, England, have invented an Improved Gland-Packing, of which the following is a specification.

This invention relates to packings adapted for use in ordinary glands through which rods, spindles, gage-glasses, and the like pass, but is also applicable in packing the plugs of cocks and other bodies with a view to rendering them tight under steam or other fluid pressure.

The accompanying drawings illustrate packings constructed according to my improved method.

Figure 1:
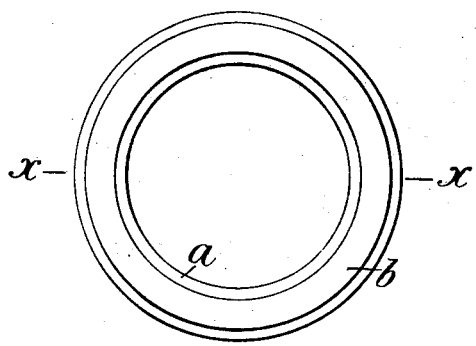
Figure 3:
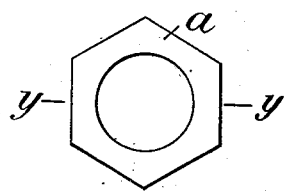
Figure 5:
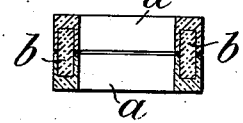
Figure 2:
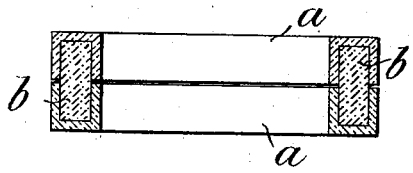

Figure 1 is a face view of one form of the packing, the upper ring having been removed. Fig. 2 is a transverse section on the line $x\,x$ in Fig. 1. Fig. 3 is a face view of another form of the packing, Fig. 4 being a similar view with the upper ring removed, while Fig. 5 is a transverse section on the line $y\,y$ in Fig. 3.

Figure 4:
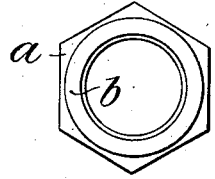

Assuming the invention to be applied to an ordinary gland, the improved packing comprises two rings $a\,a$, each formed with a groove in one of its faces and arranged with their grooved faces opposite one another, the space formed by the two grooves being occupied by a solid ring $b$. The rings $a\,a$ are composed of asbestos fiber and india-rubber vulcanized to a hard condition, while the solid ring $b$ is formed of india-rubber and asbestos, plumbago, or other suitable powder mixed in such proportions as to render the product when vulcanized comparatively soft and yielding. On such a packing being subjected to pressure in an axial direction the ring or core $b$, of soft rubber, yields in the direction of the pressure, but in so doing exerts a lateral or radial pressure upon the walls of the rings $a\,a$, with the effect that they are forced into intimate contact with the wall of the inclosing gland and with the surface of the spindle, rod, gage-glass, or other stem to which the gland is applied. The rings $a\,a$ may assume various external shapes, such as cylindrical, as shown in Figs. 1 and 2, or hexagonal, as represented in Figs. 3, 4, and 5, according to the particular uses to which they are applied.

What I claim as my invention, and desire to secure by Letters Patent, is—

1. The herein-described packing for stuffing-boxes and the like, consisting of two rings composed of flexible material placed face to face and having annular grooves in their adjacent faces and a solid core of soft yielding substance occupying the cavity formed by the two grooves.

2. The herein-described packing for stuffing-boxes and the like consisting of two rings $a\,a$ composed of a vulcanized mixture of asbestos fiber and india-rubber, and having grooves in their adjacent faces, in conjunction with a solid core $b$ arranged to occupy the cavity formed by the grooves and composed of a vulcanized mixture of india-rubber and plumbago or equivalent powder adapted to render the said core comparatively soft and yielding, substantially as set forth.

In testimony whereof I have signed my name to this specification in the presence of two subscribing witnesses.

JOHN DEWRANCE.

Witnesses:
PERCY E. MATTOCKS,
WM. O. BRADY.